United States Patent
Heskett

(10) Patent No.: US 6,197,204 B1
(45) Date of Patent: Mar. 6, 2001

(54) ZINC OXIDE FLUID TREATMENT

(75) Inventor: Don E. Heskett, White Pigeon, MI (US)

(73) Assignee: KDF Fluid Treatment, Inc., Three Rivers, MI (US)

( * ) Notice: Subject to any disclaimer, the term of this patent is extended or adjusted under 35 U.S.C. 154(b) by 0 days.

(21) Appl. No.: 09/488,814

(22) Filed: Jan. 21, 2000

(51) Int. Cl.$^7$ .................................................. C02F 1/58
(52) U.S. Cl. ......................... 210/749; 210/807; 210/911
(58) Field of Search .................................. 210/749, 807, 210/911

(56) References Cited

U.S. PATENT DOCUMENTS 4,954,330 * 9/1990 Ziegenhain .
5,268,091 * 12/1993 Boitiaux et al. .
5,603,836 * 2/1997 Wollrich .
6,106,726 * 8/2000 Fujita et al. .

FOREIGN PATENT DOCUMENTS

412862 * 1/1999 (EP) .
403076789 * 4/1991 (JP) .

* cited by examiner

Primary Examiner—David A. Simmons
Assistant Examiner—Betsey Morrison Hoey
(74) Attorney, Agent, or Firm—Cook, Alex, McFarron, Manzo, Cummings & Mehler, Ltd.

(57) ABSTRACT

The concentration of dissolved arsenic in water is reduced by contacting the water containing the arsenic with zinc oxide.

9 Claims, No Drawings

ZINC OXIDE FLUID TREATMENT

The present invention relates to the removal of arsenic contaminants from fluids and, more particularly, to a method of treating water with zinc oxide to remove arsenic contaminants from the water.

Raw water may contain undesirable levels of toxic arsenic contaminants. These waters may include for example, industrial, agricultural and/or mining waste waters, as well as natural water sources, and the arsenic may be present in the water due to natural environmental conditions, pollutants or both. Substantial reduction or removal of arsenic contaminants is desirable where the water is to be returned to the environment in as clean as possible form or is to be used as potable water.

Dissolved arsenic in water is primarily arsenates (+5) and arsenites(+3). The arsenates include $HAsO_4^{2-}$, $H_2AsO_4^-$, and $H_3AsO_4$, while the arsenites are $H_2AsO_3^-$ and $H_3AsO_3$. In the past dissolved arsenic has been adsorbed by several materials, including ferric hydroxide [$Fe(OH)_3$] and aluminum oxide [$Al_2O_3$] with the arsenates being more strongly sorbed than the arsenites. Dissolved arsenic also has been removed by passing the water containing the arsenic through a particulate metal alloy bed of copper and zinc as disclosed in my U.S. Pat. No. 5,275,737.

It has been discovered in the present invention that contact of the water containing arsenic contaminants with zinc oxide is also effective in the removal of arsenic from the water, and the zinc oxide exhibits a greater affinity for arsenites than the other oxides previously employed in arsenic removal.

Accordingly, in one principal aspect of the present invention, a method for reducing the concentration of arsenic in a liquid comprises contacting the liquid containing the arsenic with zinc oxide.

In another principal aspect of the present invention, the liquid is water.

In still another principal aspect of the present invention, the arsenic includes arsenates and/or arsenites.

In still another principal aspect of the present invention, the liquid containing the arsenic is flowed through a bed of the zinc oxide to reduce the concentration of the arsenic.

In still another principal aspect of the present invention the zinc oxide is a finely divided particulate.

In the present invention the liquid containing the arsenic contaminants including arsenates and/or arsenites is contacted with the zinc oxide. The zinc oxide is preferably in a finely divided form and preferably in particulate form. The zinc oxide is also preferably treated to maximize the surface area for contact. The zinc oxide also preferably comprises a bed through which the arsenic containing water is passed.

EXAMPLE 1

Challenge water was delivered to a zinc oxide medium using a closed system apparatus that complies with the National Sanitation Foundation ANSI/NSF 42-1996 standard. This system was composed of two 500-gallon storage tanks that fed a 1-inch PVC test line via a ¾-hp pump attached to a bladder tank. The challenge water used in the tests was well water that had the following analysis prior to the addition of the arsenic:

| | |
|---|---|
| pH | 7.00 |
| Conductivity | 695 µS/cm |
| Total Dissolved Solids | 350 mg/l total ionic |
| Total Alkalinity | 300 mg/l as $CaCO_3$ |
| Total Hardness | 390 mg/l as $CaCO_3$ |

-continued

| | |
|---|---|
| Calcium | 100 mg/l ionic |
| Magnesium | 54 mg/l ionic |
| Sodium | 3.97 mg/l ionic |
| Potassium | 2.35 mg/l ionic |
| Iron (total) | 0.24 mg/l ionic |
| Copper (dissolved) | none detected |
| Zinc (dissolved) | 0.01 mg/l ionic |
| Sulfate | 46 mg/l ionic |
| Nitrate | 0.60 mg/l ionic |
| Orthophosphate | 0.05 mg/l ionic |
| Chloride | 50 mg/l ionic |
| Silica | 10.1 mg/l ionic |

One batch of challenge water was made by dissolving 4 g of sodium arsenate in one liter of water and then mixing that arsenate containing liter into 500 gallons of the well water. A second batch of challenge water was made by dissolving 3 g of sodium arsenite in another liter of water, and then mixing the arsenite containing liter of water into another 500 gallons of the well water. The pH of each batch of challenge water was readjusted to the range of 6.5–7.0 by adding 29% nitric acid following the arsenic addition.

The zinc oxide was high purity 99.99% pure, was granular in form, and had a mean granular size of 8–325 mesh, a specific gravity of 5.6 and an apparent density of 90–140 lbs/ft$^3$ (nominal 110 lbs/ft$^3$). 0.0155 lbs/ft$^3$ of this granular zinc oxide was placed in a 9¾ inch filter container, and the challenge water was flowed through the zinc oxide at the rate of 0.50 gpm.

Because the removal mechanism is believed to be by absorption, a recovery period was used in the testing. This consisted of running the filter on an off and an on cycle for specified lengths of time. Initially this was set at a two-minutes-on, 15-minutes-off cycle. This was changed to a standard 15-on and 15-off cycle after an initial 10-gallons of challenge water had been passed through the zinc oxide medium.

The sampling procedure consisted of taking 250 ml samples of effluent water immediately at the start of each on cycle for the static tests. Throughout the testing a number of samples were also taken while the system was running for the dynamic tests to differentiate adsorption rates for static and dynamic use of the zinc oxide medium. Total arsenic was determined using Standard Method 18$^{th}$ 3500-As C, silver diethyldithiocarbamate method. (American Public Health Association). According to the Beer-Lambert Law, absorbance is directly proportional to concentration of the free atoms present in solution. Absorbance of raw and treated waters was recorded using a Hack DR2000 Spectrophotometer. The theoretical yield of total arsenic in the challenge water influent was calculated to be in the range of 250–500 ppb, which was consistent with standard testing methods.

The results were as follows:

| | Influent | Effluent | |
|---|---|---|---|
| Gallons Treated | As (absorbance, nm) | As(absorbance, nm) | % Reduction in As |
| | Arsenite (+3) Removal (Static): | | |
| 2 | 1.95 | 0.40 | 79 |
| 3 | 1.95 | 0.65 | 67 |

-continued

| Influent | | Effluent | |
|---|---|---|---|
| Gallons Treated | As (absorbance, nm) | As(absorbance, nm) | % Reduction in As |
| 4 | 4.53 | 0.47 | 90 |
| 5 | 4.53 | 1.60 | 65 |
| 6 | 2.40 | 0.60 | 75 |
| 7 | 2.40 | 0.50 | 79 |
| 150 | 2.40 | 0.85 | 65 |
| 300 | 4.04 | 1.32 | 67 |
| 500 | 2.31 | 0.99 | 57 |
| 800 | 2.72 | 2.08 | 24 |
| 830 | 2.33 | 1.29 | 45 |
| 1300 | 5.95 | 3.65 | 39 |
| Arsenate (+5) Removal (Static): | | | |
| 1920 | 6.64 | 1.33 | 80 |
| 1970 | 7.29 | 2.45 | 66 |
| 2500 | 1.52 | 2.03 | — |
| Arsenite (+3) Removal (dynamic): | | | |
| 1 | 1.95 | 0.95 | 51 |
| 2 | 1.95 | 0.93 | 52 |
| 3 | 4.53 | 1.00 | 78 |
| 4 | 4.53 | 1.05 | 77 |
| 5 | 2.40 | 1.45 | 40 |
| 6 | 2.40 | 1.80 | 25 |

This test data shows that zinc oxide has the ability to adsorb both dissolved arsenates and arsenites from water to varying degrees. The test data also shows the medium has a greater affinity for arsenate than arsenite which is consistent with other oxides that previously have been employed for arsenic removal, such as aluminum and iron. However, it appears that zinc oxide has a greater affinity for arsenite than other oxides. The test data also shows that contact time with the zinc oxide medium is important. When the filter is run and samples taken the efficiencies were much lower in the dynamic test than in the static tests.

EXAMPLE 2

Challenge water containing arsenate (+5) was prepared as in Example 1. This challenge water was flowed through a zinc oxide medium as described in Example 1. A dynamic test of 400 gallons of challenge water was conducted by flowing the challenge water at 0.20 gpm (20 gpm/ft$^3$ zinc oxide) through a 2.50 inch diameter filter vessel containing 0.01 ft$^3$ of medium with a bed height of 3.75 inches.

An additional dynamic test of 1000 gallons of challenge water containing arsenate was conducted by flowing the challenge water at 0.50 gpm (6 gpm/ft$^3$ zinc oxide) through a 3.0 inch diameter filter vessel containing 0.08 ft$^3$ of medium with a bed height of 20 inches. In these testes, a recovery period was used in which the filter was operated in 15 min. on—15 min. off cycles.

Test samples of 250 ml of influent were taken at the beginning of each test, and several dynamic samples of effluent were taken during the test and 30 sec after a 15 min on cycle had commenced. The amount of arsenic was determined using Standard Method 3113-A, B, and a Perkin-Elmer Aanalyst 800 atomic adsorption spectrometer with a THGA graphite furnace.

The test results were as follows:

| Influent | | | | Effluent | | |
|---|---|---|---|---|---|---|
| Gallons Treated | Total As (ppb) | Total Dissolved Solids mg/l | pH | Total As (ppb) | Zn (ppb) | % Reduction in As |
| 400 Gallon Challenge: | | | | | | |
| 12 | 130.0 | 298 | 7.33 | 19.6 | 9.57 | 85 |
| 56 | 112.8 | 268 | 7.27 | 20.8 | 2.56 | 82 |
| 110 | 89.9 | 303 | 7.37 | 32.5 | 2.08 | 64 |
| 200 | 85.7 | 299 | 7.30 | 36.6 | 1.61 | 57 |
| 248 | 105.4 | 283 | 7.68 | 48.1 | 1.20 | 54 |
| 330 | 143.7 | 298 | 7.00 | 38.5 | 0.99 | 73 |
| 400 | 183.6 | 299 | 7.10 | 73.8 | 0.95 | 60 |
| 1000 Gallon Challenge: | | | | | | |
| 180 | 249.8 | 282 | 7.30 | 48.8 | 2.88 | 80 |
| 420 | 198.0 | — | 7.47 | 76.0 | 2.98 | 61 |
| 660 | 136.0 | — | 7.28 | 63.0 | 2.55 | 54 |
| 900 | 29.9 | — | — | 6.70 | — | 78 |
| 915 | 15.5 | — | — | 4.90 | — | 68 |

The test data confirms the conclusions reached in Example 1.

It will be understood that the preferred embodiments of the present invention which have been described is merely illustrative of the principles of the invention. Numerous modifications may be made by those skilled in the art without departing from the true spirit and scope of the invention.

I claim:

1. A method for reducing the concentration of arsenic in a liquid, said method comprising contacting the liquid containing the arsenic with finely divided zinc oxide.

2. The method of claim 1, wherein said liquid is water.

3. The method of claim 1, wherein said arsenic is an arsenate and/or arsenite.

4. The method of claim 1, wherein said liquid containing said arsenic is flowed through a bed of said zinc oxide to reduce the concentration of said arsenic.

5. The method of claim 1, wherein said liquid containing said arsenic is cyclically contacted with said zinc oxide.

6. The method of claim 1, wherein said finely divided zinc oxide is particulate.

7. The method of claim 1, wherein said arsenic is an arsenate and/or arsenite; said liquid is water; and said liquid containing said arsenic is flowed through a bed of said zinc oxide to reduce the concentration of said arsenic.

8. The method of claim 7, wherein said finely divided zinc oxide is particulate.

9. The method of claim 7, wherein said liquid containing said arsenic is cyclically contacted with said zinc oxide.

\* \* \* \* \*

UNITED STATES PATENT AND TRADEMARK OFFICE
CERTIFICATE OF CORRECTION

PATENT NO. : 6,197,204 B1
DATED : March 6, 2001
INVENTOR(S) : Don E. Heskett

It is certified that error appears in the above-identified patent and that said Letters Patent is hereby corrected as shown below:

Column 2,
Line 56, after "The" insert -- test --.

Signed and Sealed this

Fourth Day of February, 2003

JAMES E. ROGAN
*Director of the United States Patent and Trademark Office*